United States Patent [19]

Eggert

[11] Patent Number: 5,230,910
[45] Date of Patent: Jul. 27, 1993

[54] APPARATUS FOR THE COLD DEEP DRAWING OF FILMS

[76] Inventor: Henrich Eggert, Eicherweg 14, D-7931 Oberstadion, Fed. Rep. of Germany

[21] Appl. No.: 582,563

[22] Filed: Sep. 14, 1990

[30] Foreign Application Priority Data

Sep. 26, 1989 [DE] Fed. Rep. of Germany ....... 3932054

[51] Int. Cl.⁵ .............................................. B29C 51/00
[52] U.S. Cl. .................................... 425/385; 425/398; 425/403; 425/418; 425/454; 425/457; 425/DIG. 22
[58] Field of Search ............... 425/383, 385, 398, 400, 425/402, 403, 412, 418, 454, 457, 469, DIG. 22

[56] References Cited

U.S. PATENT DOCUMENTS

| | | | |
|---|---|---|---|
| 2,568,956 | 9/1951 | Fienberg et al. | 425/385 |
| 3,307,502 | 3/1967 | Armour | 425/383 |
| 3,345,684 | 10/1967 | Scherrer-Wirz | 425/418 |
| 4,133,625 | 1/1979 | Kellermann et al. | 425/383 |
| 4,534,927 | 8/1985 | Morioka et al. | 425/398 |

FOREIGN PATENT DOCUMENTS 903164  2/1982  U.S.S.R. ............................. 425/418

Primary Examiner—Jay H. Woo
Assistant Examiner—Scott Bushey
Attorney, Agent, or Firm—David E. Frankhouse; Alan R. Stempel; Mary Ellen Timbers

[57] ABSTRACT

An apparatus for forming depressions in thermoplastic film. The apparatus uses rotating dies to first frictionally heat and soften the film, and to then urge the film into bores in a mold, thereby forming the depressions. The plastic films thus produced are useful in the production of packaging.

4 Claims, 2 Drawing Sheets

APPARATUS FOR THE COLD DEEP DRAWING OF FILMS

FIELD OF THE INVENTION

The invention relates to a process and an apparatus for the "cold deep drawing" of films, characterised in that only the parts which are to be deformed during the deep drawing process are heated slightly shortly before and/or during the deep drawing process, but not the parts which are not deformed during the drawing process.

BACKGROUND OF THE INVENTION

The processes known hitherto operate on the principle that in so called deep drawing apparatus, i.e. thermoforming machines, films, such as plastics films, are heated primarily by infrared radiation or by so called contact heating and in this way are brought into a plastic state.

The plastic behaviour of these films is used to change this plasticized plastics film into the desired shape using a rotating vacuum roller or a special deforming tool (upper and lower deforming plate), by means of compressed air and optional prestretching dies integrated in the deforming tool.

In both processes, relatively large amounts of heat are needed to heat the plastics film in order to bring them into the plastic state.

In order to keep the plasticized plastics film, which is in a certain form in the moulding tool, in a stable shape and to allow it to be removed from the mould, this tool must be kept at a temperature at which the plasticized plastics film solidifies, so that this deformed plastics film retains a stable shape.

The heating energy which is required in the processes described is not inconsiderable. At the same time further energy is required to cool the film in order to make the deformed film stable in shape again.

In the packaging industry very large quantities of pvc films and combinations thereof are processed using these methods. However, these pvc films, the waste material stamped out and empty packages are environmentally harmful, if not toxic and cannot readily be disposed of.

Film manufacturers have now started to produce films from polypropylene (pp) which are environmentally more acceptable and can in the end be burned to produce water vapour and carbon dioxide without forming any acids or harmful gases.

The disadvantages of these polypropylene films is that they have a poorer heat transmission that pvc films. This means that more energy is required to process these films by the known methods. At the same time this means that more energy is required to cool the deforming tools as well.

Examples from Japan and the USA, where the polypropylene films have been processed by the methods described for some years, are proof of this.

Another disadvantage of polypropylene films is that existing deep drawing tools or apparatus, which were originally designed for processing pvc films, for the most part cannot be used for deforming polypropylene films since these systems are unable to accommodate the heating and cooling equipment needed. Nor can the existing tools for processing pvc films be used for the more difficult processing of polypropylene films since the expansion coefficient or the shrinkage factor of these two types of plastics films are very different.

German Patent 3203336 describes an apparatus of the type mentioned hereinbefore by means of which a step is formed on a portion of a cup-shaped container. The step is formed by means of a forming die acted upon by ultrasound, with the film being sharply round.

SUMMARY OF THE INVENTION

The invention starts from the process defined hereinbefore and has the objective of performing the deep drawing operations even with very critical materials with a very low energy expenditure and hence keeping the shape of the products without any risk of distortion.

To solve this problem, according to the invention, only the parts which are to be deformed during the deep drawing process are heated shortly before the deep drawing process in metered manner using a friction element, but not the parts which are not deformed during the drawing process.

Thus, in the apparatus according to the invention, the support for the film is formed as a deep drawing mould with bores associated with the wells or depressions which are to be formed, and the friction element is formed as a deep drawing die which is adapted to be driven so as to rotate about its longitudinal axis running perpendicularly to the surface of the film. No heating energy is supplied from outside but is generated immediately around and on the film by friction, which is briefly generated directly in the area of action on those parts of the film which are to be deformed during the drawing operation, i.e. only in the softening area, by means of the friction element which moves relative to the film. This results in a very low energy consumption.

As a result of an accurate guiding of the friction element the quantity of heat generated can be metered precisely without exceeding any decomposition limit or the like. A larger number of such friction elements may be provided if for example a large number of tablets or the like are to be accommodated in a packaging plane.

The process according to the invention and the apparatus according to the invention are intended primarily for plastics films and particularly for polypropylene films, but may also be used for any other suitable film materials, e.g. sheet metal, possibly aluminium or a noble metal. If the material is a poor conductor of heat, there is generally no need to provide cooling between the briefly heated parts of the films which are to be deformed and in the case of good conductors mass dissipation is totally adequate, without the need for active cooling in the region of the parts of the film which are to be deformed. However, these conditions will vary depending on the material of the film, the method used and particularly the speed of manufacture, which means that the question of intermediate cooling will have to be decided separately for each particular case.

The low energy consumption is achieved particularly by the fact that the brief heating of the parts of the film to be deformed is carried out without any heat energy being supplied directly from outside and the heat energy required is generated directly in or on the film.

The heat energy for softening the film is supplied purely by frictional heat which is generated briefly in the immediate area of action on the parts of the film which are to be deformed during the drawing process. Clearly, heat is not transmitted from outside but generated in the softening area. This is achieved by the fact that the parts of the film to be softened are brought into direct contact with a friction element moving relative thereto. For this purpose, a deep drawing die is used, which is provided for forming a depression or well in the film and which is set in rotation at least during the deep drawing process. This construction also has the advantage that the friction element can be guided precisely and as a result the quantity of heat required can be metered accurately without exceeding any decomposition limits or the like.

The invention further relates to an apparatus for "cold deep drawing" of films, particularly for performing the process described earlier, having a mould for supporting and retaining the film in the deep drawing process and having a deforming tool which is moveable at right angles to the surface of the film and the mould. This apparatus is characterised according to the invention by a softening device provided on the film in the region of the parts thereof which are to be deformed, and expediently having at least one friction element which is adapted to be brought to rest on the film. A larger number of such friction elements may be provided if for example a large number of mouldings, e.g. tablets or sweets, are to be accommodated in one plane of packaging.

BRIEF DESCRIPTION OF THE DRAWINGS

Further features and embodiments of the invention are described in detail below with reference to the drawings, wherein.

DETAILED DESCRIPTION OF THE INVENTION

Figure 1:
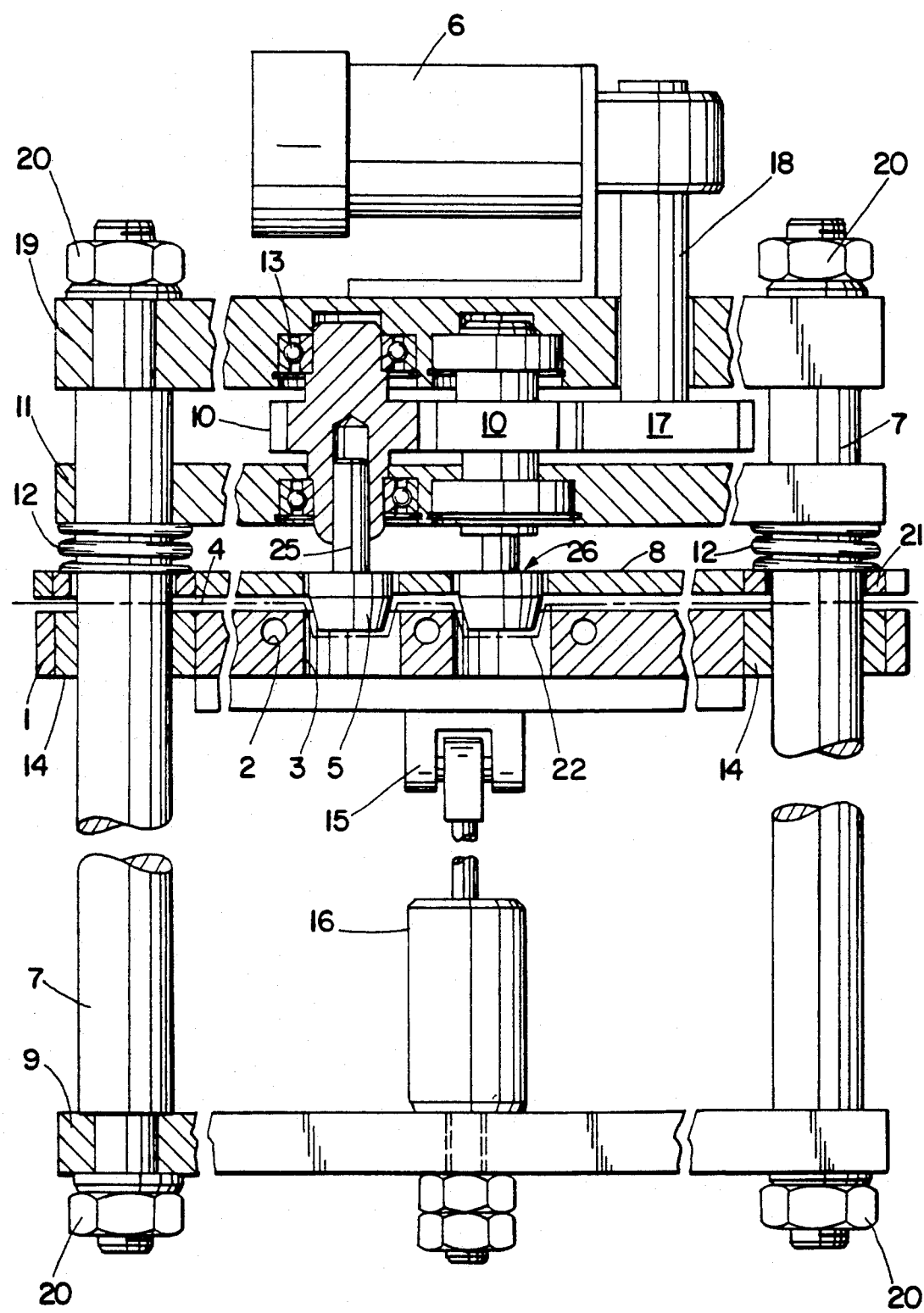
FIG. 1 is a vertical partial section through a deep drawing device according to the invention for a package containing tablets or coated tablets, in the closed state

In the deep drawing apparatus according to the invention which is illustrated, heat is not supplied by heat radiation or by radiation energy in general nor by contact heating, as is the basic prerequisite for plastic deformation in the process described at the beginning.

For deforming the plastics film (4) a cooled deep drawing mould (1) is used, the plastics film (4) being heated in each operating cycle only by frictional heat which is briefly generated in the film or on the surface thereof, directly at the deformation sites thereof.

In other words local frictional heat has only to be applied to those parts of the film which are directly deformed, by means of a softening device (26).

This is done by means of rotary deep drawing dies (5) consisting of poor conductors of heat, so that scarcely any heat is allowed to escape outwards. The frictional heat generated is just sufficient in the case of polypropylene films, to achieve the deformation of the plastics film (4) with the deep drawing die (5), in the form shown.

These deep drawing dies (5) are located on pinion shafts (10) which rotate about their axes (25), are connected to a common drive motor (6) and are set in rotation by the drive motor, usually continuously.

The film (4) which is to be deformed is clamped at ambient temperature on the surface of the deep drawing mould (1) with the holder (8) guided in axial bearings (21), and is held on the cooled deep drawing mould (1) by the return spring (12). The lifting unit (16) which is coupled to the assembly plate (15) and to the fixing plate (9) lifts the deep drawing mould (1) vertically up the guide columns (7) so that the inserted plastics film (4) is held firmly between the holder (8) and the deep drawing mould (1) and, as illustrated in FIG. 1, deformed by the rotating deep drawing dies (5). The cooling channel (2) in the deep drawing mould (1) is acted upon with water to improve the removal of heat. Whether or not this additional cooling is required must be decided in each individual case according to the operational circumstances and the material used for the film.

Under the axial pressure of the deep drawing die (5) rotating at a relatively slow speed, the locally heated plastics film (4) is forced into the mould bore (3) and momentarily hardened therein under the effect of the cooling medium which is carried in the cooling channel (2) in the deep drawing mould (1).

Figure 2:
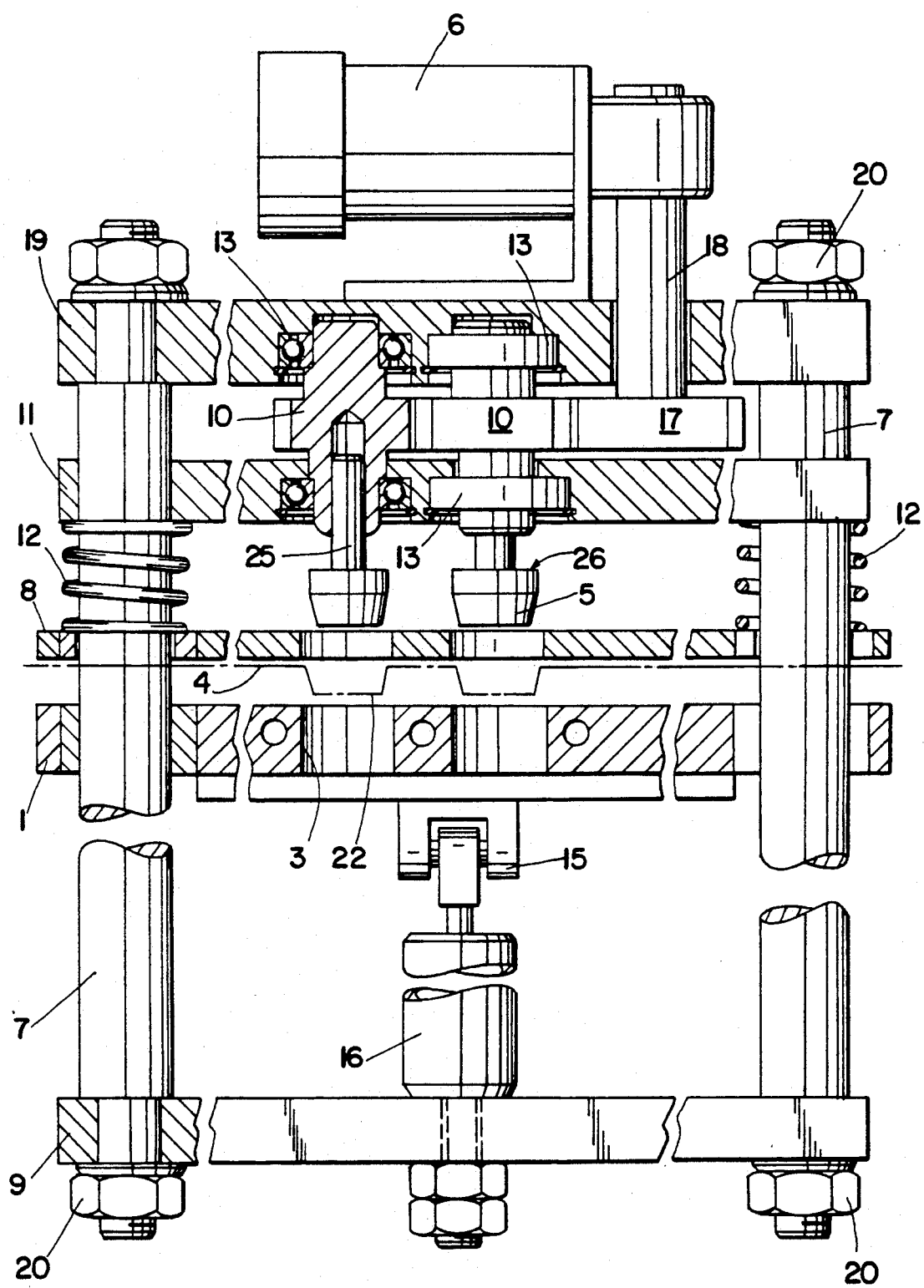
FIG. 2 shows the apparatus according to FIG. 1 in the open position.

After the deep drawing mould (1), which is provided with axial bearings (14), has been lowered, the deformed plastics film (4) is stripped off by the holder (8) under the effect of the return spring (12), as illustrated in FIG. 2.

Reference numerial (11) denotes the lower bearing plate and (19) the top bearing plate. Between the bearing plates (11,19) the pinion shafts (10) are centrally guided in the bearings (13). These pinion shafts are centrally driven by the drive pinion (17), which is located on the drive shaft (18) of the smoothly regulatable drive (6). The deep drawing dies (5) are replaceably fitted on the pinion shafts (10) and can be replaced by dies of different configuration as necessary.

The entire tool unit is mounted on the guide columns (7) and fixed by means of the nuts (20).

Reference numerial (22) denotes the deep drawn well or depression as produced according to FIG. 2 without any external heat in the apparatus.

What is claimed is:

1. An apparatus for forming one or more depressions in a thermoplastic film, comprising:
   a) a mold, having a generally planar surface upon which the thermoplastic film is placed, and further having one or more generally cylindrical bores which extend perpendicularly from the planar surface into the mold, with each bore having an opening at the planar surface;
   b) a holder for releasably clamping the thermoplastic film to be worked upon against the planar surface of the mold and restraining it from movement;
   c) means for urging the holder into clamping relationship with the mold;
   d) one or more dies, each being rotatable about an axis which is perpendicular to the planar surface of the mold, each corresponding to a bore in the mold, and each being of proper size to fit into a corresponding bore in the mold;
   e) means for rotating the dies; and,
   f) means for moving the mold in a direction which is perpendicular to the planar surface, whereby such movement initially brings the dies into contact with areas of the thermoplastic film which is clamped against the planar surface, whereupon rotation of the dies frictionally heats the areas of the film so contacted and softens them, and whereby further such movement then causes the dies to urge these softened areas of the film into the corresponding bores in the mold, thereby forming the desired depressions in the film.

2. The apparatus of claim 1, wherein said dies are formed from a material which is a poor conductor of heat.

3. An apparatus for forming one or more depressions in a thermoplastic film, comprising:
   a) one or more guide columns;
   b) a mold, having a generally planar surface upon which the thermoplastic film is placed, one or more generally cylindrical bores which extend perpendicularly from the planar surface into the mold, with each bore having an opening at the planar surface, and further having axial bearings through which the guide columns pass, the mold being movable along the guide columns in first and second directions which are perpendicular to the planar surface;
   c) a holder for releasably clamping the thermoplastic film to be worked upon against the planar surface of the mold and restraining it from movement, the holder having bearings through which the guide columns pass and being movable along the guide columns in the first and second directions which are perpendicular to the planar surface;
   d) resilient means for urging the holder into clamping relationship with the mold when the mold is moved in the first direction;
   e) first and second bearing plates;
   f) one or more dies, each mounted on a pinion shaft which is rotatably retained between the first and second bearing plates, whereby each die is rotatable about an axis which is perpendicular to the planar surface of the mold, and wherein each die corresponds to a bore in the mold and is of proper size to fit into the corresponding bore in the mold;
   g) a drive pinion for rotationally driving the pinion shafts;
   h) a motor for rotationally driving the drive pinion; and,
   i) means for moving the mold in the first and second directions, whereby movement of the mold in the first direction initially causes the holder to be urged into clamping relationship with the mold, thereby clamping the thermoplastic film against the planar surface of the mold, whereby further such movement next brings the dies into contact with areas of the thermoplastic film which is clamped against the planar surface, whereupon rotation of the dies frictionally heats the areas of the film so contacted and softens them, and whereby further such movement then causes the dies to urge these softened areas of the film into the corresponding bores in the mold, thereby forming the desired depressions in the film, and whereby movement of the mold in the second direction first removes the dies from contact with the thermoplastic sheet and next removes the holder from clamping relationship with the mold, thereby releasing the thermoplastic film from the apparatus.

4. The apparatus of claim 3 wherein the dies are formed of a material which is a poor conductor of heat.

* * * * *